June 16, 1953  W. D. TEAGUE, JR., ET AL  2,642,543
SELF-CONTAINED POWER UNIT
Filed Nov. 24, 1951
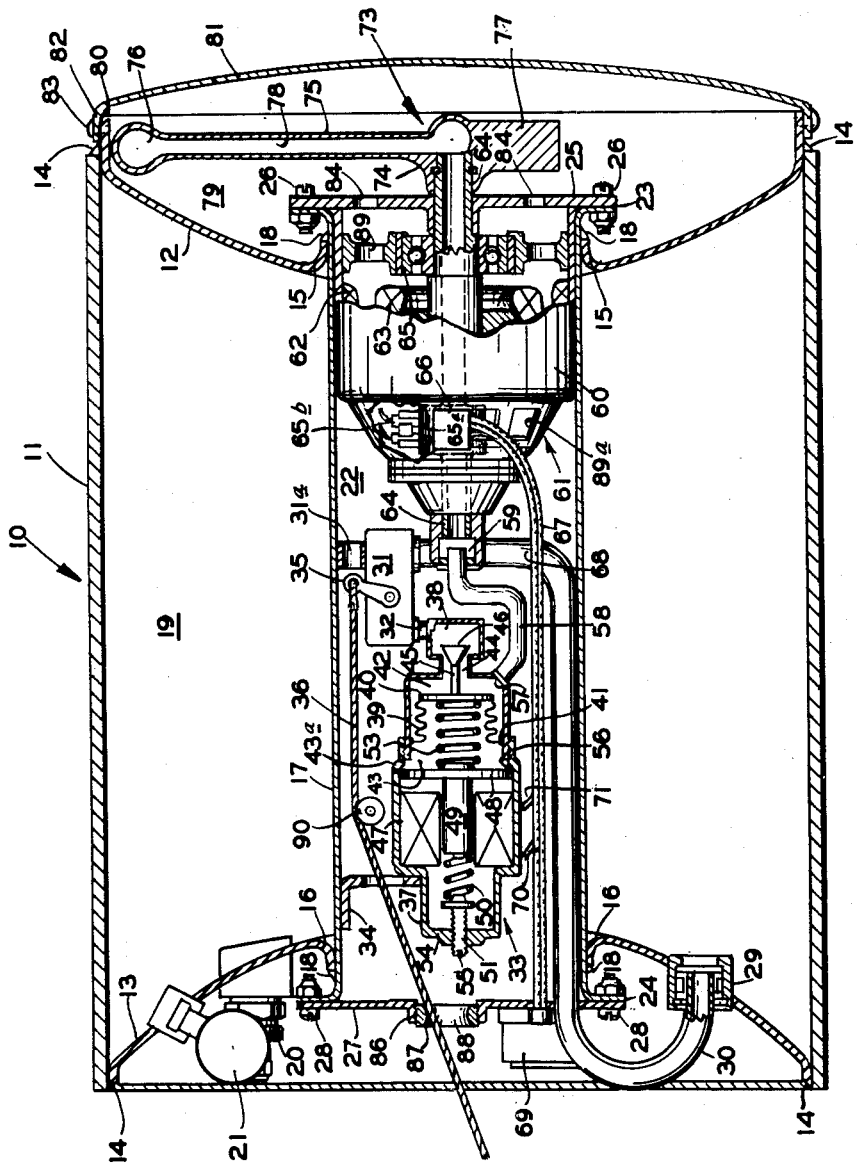
INVENTORS
WALTER D. TEAGUE JR.
EMIL A. VOLK JR.
BY Herbert L. Davis, Jr.
- ATTORNEY -

Patented June 16, 1953

2,642,543

UNITED STATES PATENT OFFICE 2,642,543

SELF-CONTAINED POWER UNIT

Walter D. Teague, Jr., Alpine, and Emil A. Volk, Jr., Hasbrouck Heights, N. J., assignors to Bendix Aviation Corporation, Teterboro, N. J., a corporation of Delaware Application November 24, 1951, Serial No. 258,072

14 Claims. (Cl. 290—52)

1

This invention relates generally to power plants for generating electrical energy and more particularly has to do with a self-contained electrical generating plant adapted for use in vehicles such as aircraft, missiles, rockets and the like that are designed to operate at various altitudes including extremely high altitudes.

Vehicles of the type above set forth, often require a source of electrical energy to operate the electrical accessories thereof. Since storage space within the vehicle is usually at a premium, it is desirable that the electrical power plant be designed and constructed so as to occupy a minimum of space. To that end, the instant invention contemplates the provision of a compact, self-contained, electricity generating unit wherein a generator is operated by a turbine driven from a source of pressurized operating fluid, such as compressed air contained within the unit.

Since the source of pressurized operating fluid is contained within the unit and therefore limited, it is manifest that the pressure thereof varies as it is used to drive the turbine. Thus, initially the pressure of the operating fluid is of a relatively high value that decreases as the fluid is expended in driving the turbine. To insure proper operation of the electrically actuated accessories, however, the speed and voltage output of the generator should be maintained at a substantially constant value. Moreover, the output of the generator should be maintained at a substantially constant value in the presence of constant or varying loads imposed thereon.

Therefore, the present invention provides adjustable pressure regulating means constructed and arranged to deliver the operating fluid at a substantially constant pressure to the turbine. Moreover, to provide for a constant output from the generator in the presence of constant or varying loads imposed thereon, the pressure regulating means are made responsive to the output of the generator. Thus, in the presence of varying loads above or below a predetermined value the pressure of the operating fluid delivered to the turbine is varied to thereby vary the speed of the turbine, and hence the output of the generator, until the output is brought into balance with the load demand thereon. To those ends, a pressure regulating valve including a pressure responsive bellows having spring biasing means adjustable to vary the responsiveness of the bellows, controls the pressure of the operating fluid from the source thereof to the turbine. A linear solenoid connected to the adjustment means of the valve and to the generator is adapted to operate the valve adjustment means in response to the voltage output of the generator to thereby control the pressure of the operating fluid delivered to the turbine and hence the output of the generator.

It has been found that at high altitudes, for example, altitudes in excess of 35,000 feet, the density of the atmosphere does not accommodate the rapid transfer of heat from a generator to the surrounding atmosphere, and therefore, the generator tends to overheat. Moreover the relatively low atmospheric pressure at these high altitudes results in undesirable arcing of the generator. And, in instances where the generator utilizes carbon brushes, the relatively low oxygen content of the atmosphere at high altitudes results in excessively rapid and hence undesirable wear of the brushes.

The present invention, therefore, provides means whereby a generator may be operated under ambient conditions substantially corresponding to the atmosphere at a predetermined desirable altitude. Furthermore, means are provided to pass a suitably dense cooling fluid stream over and through the generator thus assisting heat transfer from the generator to cool the same.

To accomplish these ends, the generator is mounted within a chamber and the driving or operating fluid exhausted from the turbine, which is at a relatively high pressure, is conducted into this chamber. An exit orifice having a predetermined cross-sectional area communicates the chamber with the atmosphere thereby providing for a given flow of the turbine exhaust fluid through the chamber and the maintenance of a desirable pressure therein. Thus, by controlling the venting of the turbine exhaust from the chamber within which the generator is mounted, desirable ambient conditions are maintained in the chamber and therefore around the generator and a cooling fluid stream is circulated through the chamber to cool the generator.

The above and other objects and features of the instant invention will appear more fully hereinafter from a consideration of the following description taken in connection with the accompanying drawing wherein one embodiment of the invention is illustrated by way of example.

The drawing is a longitudinal section through the novel self-contained electric generating power plant contemplated by the present invention.

Referring now to the drawing, the reference character 10 designates a tank having an outer cylindrical wall 11 and concave end walls 12 and 13 that are sealingly secured at their peripheral edges to outer wall 11 by suitable sealing and fastening means such as welding 14. End walls 12 and 13 are centrally apertured and the edges thereof adjacent these apertures are turned outwardly to form annular lateral flanges 15 and 16 on end walls 12 and 13, respectively, that are adapted to receive a cylindrical sleeve 17. Sleeve 17 extends between end walls 12 and 13 and is sealingly secured to flanges 15 and 16 by suitable sealing and fastening means such as welding 18.

Due to the foregoing construction, tank 10 is provided with a chamber 19 defined by outer wall 11, end walls 12 and 13 and sleeve 17 that is adapted to hold a pressurized operating fluid such as compressed air. In order to introduce the operating fluid into chamber 19 and to indicate the pressure thereof, a conventional filler or inlet valve means 20 and a conventional pressure gauge 21 are mounted in end wall 13.

To provide a centrally disposed chamber 22 within tank 10, sleeve 17 is extended outwardly beyond the limits of flanges 15 and 16 and is provided with outstanding flanges 23 and 24 adjacent flanges 15 and 16, respectively. A circular plate 25 is secured by bolts 26 to flange 15 to close one end of sleeve 17, while a second circular plate 27 is secured to flange 16 by bolts 28 to close the opposite end of sleeve 17.

End wall 13 of tank 10 is provided with an outlet fitting 29, and a conduit 30 connected at one end thereof to fitting 29 passes through an opening formed in end plate 27 into chamber 22 where the opposite end thereof is secured to an initiating valve 31 suitably mounted in chamber 22 by a bracket 31a.

Initiating valve 31 is connected by means of a conduit 32 to pressure regulator assembly generally indicated by reference character 33 that is suitably mounted in chamber 22 by a bracket 34. The sole purpose of initiating valve 31 is to prevent flow of the compressed air from chamber 19 to pressure regulator assembly 33 until it is desired. Therefore, valve 31 may be any one of many well known in the art capable of performing this function.

As shown in the drawing, initiating valve 31 is provided with an actuating arm 35 to which is connected one end of a lanyard 36. Movement of arm 35 in a counterclockwise direction, in response to a pull exerted on lanyard 36 opens initiating valve 31 to permit flow into the pressure regulator assembly 33.

Pressure regulator assembly 33 includes a casing 37 having an inlet chamber 38 adapted for connection to conduit 32 and to receive the compressed air therefrom. A pressure responsive bellows 39 sealed at one end by a mounting plate 40 is sealingly secured at the open end 41 thereof to the inner surface of casing 37 to thereby define a pressure reducer chamber 42 and a reference pressure chamber 43 within casing 37. A throat or orifice 44 communicates inlet chamber 38 with pressure reducer chamber 42. Reference pressure chamber 43 communicates by way of a passage 43a formed in casing 37 with chamber 22. It is manifest, that due to this construction, bellows 39 is expanded or contracted in response to a pressure differential between the pressures within chambers 42 and 22.

To control the effective cross-sectional area of throat 44 and thereby control communication between pressure reducer chamber 42 and inlet chamber 38, a valve stem 45 secured to plate 40 extends through throat 44 and is provided with a frusto-conical valve member 46 adapted to vary the effective cross-sectional area of throat 44 upon movement relative thereto. Thus, movement of valve member 46 in the direction of throat 44 reduces the effective cross-sectional area thereof to the end that a lower pressure builds up in chamber 42 while the opposite movement of valve member 46 increases the effective cross-sectional area of throat 44 and permits a higher pressure within chamber 42.

Pressure regulator assembly 33 also includes manual and electro-responsive adjustment means for controlling the responsiveness of bellows 39 to the pressure within pressure reducer chamber 42. As shown in the drawing, the adjustment means are mounted within reference pressure chamber 43 and include a linear solenoid comprising a coil 47 secured to casing 37, an armature 48 having a piston 49 slidably received in coil 47, an armature spring 50 operatively positioned between piston 49 and a calibrating screw 51 threadedly mounted in end wall 54 of casing 37, and a bellows spring 53 mounted within bellows 39 and operative between armature 48 and end plate 40 of bellows 39. Calibrating screw 51 extends through the wall 54 of casing 37 to the exterior thereof where it is provided with a slot 55 adapted to receive a suitable tool for rotating screw 51.

To manually adjust the responsiveness of bellows 39 to the pressure within chamber 42, screw 51 is rotated in a direction to move it inwardly of casing 37. Armature spring 50 is designed and constructed to be substantially stronger than bellows spring 53 to the end that the initial inward movement of screw 51 does not compress armature spring 50 but rather moves armature spring 50 and armature 48 as a unit in the direction of a shoulder 56 formed in casing 37 and which serves as a stop for armature 48. When armature 48 engages shoulder 56, bellows spring 53 is fully compressed and biases bellows 39 in a direction to expand or distend the same. Upon further rotation of calibrating screw 51 armature spring 50 is compressed thereby adjusting the responsiveness of armature 48 to coil 47. It is manifest that due to the foregoing adjustment means, the responsiveness of bellows 39 to pressure within pressure reducer chamber 42 may be adjusted.

As will hereinafter be more fully set forth, upon energization of coil 47, armature 48 is attracted thereto thus moving armature 48 against the bias of armature spring 50, in a direction to decrease the tension or pressure setting of bellows spring 53. Moreover, coil 47, armature 48 and armature spring 50 are so constructed and arranged that the relative position of armature 48 to coil 47 is a function of the energization of coil 47. Thus, when coil 47 is highly energized, armature 48 is relatively close thereto decreasing the pressure setting of spring 53, while at lower energizations of coil 47, armature 48 is further spaced therefrom by armature spring 50 so as to increase the pressure setting of spring 53. It is manifest, therefore, that the electro-responsive means above set forth serves to adjust the pressure setting of bellows spring 53 and hence the differential pressure setting and responsiveness of bellows 39 to the pressures within chambers 42 and 43.

Pressure reducer chamber 42 is provided with an outlet 57 and a conduit 58 connects outlet 57 to an inlet chamber 59 formed in one end of a generator housing 60 suitably mounted in chamber 22.

A generator 61, is mounted within housing 60. As shown in the drawings, generator 61 includes a stationary element 62 and a rotatable element or rotor 63 fixedly secured to a hollow shaft 64 suitably journalled in bearings 65 carried by housing 60.

The generator 61 is of a conventional D. C. type having suitable sliding contact means cooperating with rotor 63 such as a commutator 65a with suitable copper segments mounted on the rotatable shaft 64 and suitable brushes 65b of the conventional carbon type cooperating with the commutator. Of course, if desired, the generator may be of the conventional A. C. type.

The output of generator 61 is conducted to a junction box 66 mounted on housing 60 and suitable electrical leads 67 and 68 connect junction box 66 to a junction box 69 mounted on end plate 27 of chamber 22 to the end that the electrical energy produced by generator 61 is made available. Junction box 66 is also connected by leads 70 and 71 to coil 47 of pressure regulator assembly 33. The leads 71 and 72 connect the coil 47 across the output of the generator 61 so that the coil 47 responds to the voltage output of generator 61.

To provide means for rotating rotor 63 and thereby operate generator 61, one end of shaft 64 communicates with the inlet chamber 59 of housing 60, while the opposite end thereof extends through a centrally disposed opening in end plate 25 of chamber 22 and has fixedly secured thereto a turbine 73. As shown in the drawing, turbine 73 is of the tangential reaction, or "pinwheel" type and comprises a hub 74, an arm 75 extending radially from hub 74 and having a reaction nozzle 76 at the outer end thereof and a weight 77 to counterbalance arm 75. To conduct the operating fluid from hollow shaft 64 to reaction nozzle 76, hub 74 and arm 75 are provided with a passageway 78 which communicates at one end with hollow shaft 64 and at the other end thereof with nozzle 76.

Turbine 73 operates in a chamber 79 formed across one end of tank 10. More particularly, end wall 12 is laterally extended to form an end flange 80. A slightly convex cover 81 is provided with a lateral flange 82 that is adapted to sealingly engage flange 80 of end wall 12 where it is secured thereto by suitable fastening means such as bolts 83.

Chamber 79 receives the compressed air discharging from nozzle 76. To utilize the compressed air which is at a higher pressure than atmospheric pressure, to pressurize chamber 22 and cool generator 61, end plate 25 of chamber 22 is provided with a plurality of vent passages 84 that communicate chamber 79 with the generator 61 mounted in chamber 22. The end wall 27 at the opposite end of chamber 22 is centrally apertured and the material adjacent the edge of the aperture is turned outwardly to form a collar 86. Collar 86 is internally threaded to receive an externally threaded insert 87 in which is formed an orifice 88. Orifice 88 serves to control or regulate the discharge of the operating fluid or compressed air from chamber 22 to the atmosphere. The flow of compressed air through the hollow shaft 64 to the turbine 73 serves to internally cool the rotor 63 and the bearings 65 supporting the shaft 64.

At altitudes in excess of about 35,000 feet the pressure and density of the atmosphere decreases to a value at which excessive wearing and arcing of the generator brushes would normally occur. In order to maintain the density of the air surrounding the generator 61 sufficiently high so as to avoid such conditions, the regulating orifice 88 is made so as to regulate the air flow from the chamber 22 so that in cooperation with the compression air inlet regulating valve assembly 33, there is maintained in the chamber 22 and about the generator 61 an enveloping fluid air of a pressure and density sufficiently high to prevent excessive arcing and wearing of the generator brushes.

Moreover, as the exhausting operating fluid or air under pressure passes from the vent passages 84 it forms a cooling fluid stream which in turn passes through louvres 89 formed in housing 60, through the generator 61, about the commutator 65a and brushes 65b and out louvres 89a into chamber 22 so as to cool the generator 61 and parts thereof. The cooling fluid stream finally passes from the chamber 22 through the regulating orifice 88 to the atmosphere.

As hereinbefore set forth, initiating valve 31 is operated by a lanyard 36. To provide means whereby initiating valve 31 may be operated from a point exteriorly of tank 10, lanyard 36 extends from arm 35 over a pulley 90 suitably mounted in chamber 22 and out through orifice 88 to a point exteriorly of tank 10.

From the foregoing description, it will be manifest to one skilled in the art that the novel power unit contemplated herein is provided with a source of operating fluid for driving turbine 73 by filling chamber 19 through filler means 20 with compressed air. It is understood, that operating fluid other than compressed air may be utilized for maintaining conditions within chamber 22 such as to prevent excessive wear and arcing of the generator brushes. For example, the operating fluid may be any suitable fluid medium effective to afford a desired heat transfer from generator 61 to the medium and in the event generator 61 employs carbon brushes, the operating fluid may be any suitable fluid medium of sufficient density and containing a sufficient amount of oxygen to prevent undesirable wearing of the carbon brushes thereof.

The power unit is actuated by pulling on lanyard 36 and thereby moving arm 35 of initiating valve 31 to open the same. Upon the opening of valve 31, the operating fluid flows from chamber 19 through conduit 30, initiating valve 31 and conduit 32 to the inlet chamber 38 of the pressure regulator assembly 33.

As above set forth, the manual adjustment of pressure regulator assembly 33 fully compresses bellows spring 53 and distends bellows 39. Therefore, valve element 46 is in its fully open position providing for a maximum flow from chamber 38 through throat 44 into pressure reducer chamber 42. Due to this positioning of the elements of pressure regulator assembly 33, the initial flow of compressed air is delivered at a relatively high pressure to the outlet 57 of pressure reducer chamber 42 from whence it is conducted through conduit 58, inlet chamber 59 of housing 60, hollow shaft 64 and passageway 78 to reaction nozzle 76 where it is effective to overcome the inertia of turbine 73 and rotate arm 74 thereof. Generator 61 is thereby operated to produce electrical energy.

The pressure of the compressed air exhausted from turbine 73 into chamber 79 is substantially higher than atmospheric pressure and therefore passes through vent passages 84 into chamber 22. As will hereinafter be more fully set forth, the flow of the exhausting compressed air through chamber 22 to the atmosphere is controlled by orifice 88 so as to maintain a desirable pressure within chamber 22. Reference chamber 43 of pressure regulator assembly 33 communicates by way of port 43a with the chamber 22.

Therefore, upon continued flow, the pressure of the compressed air in pressure reducer chamber 42 is effective on bellows 39 to compress the same against the bias of bellows spring 53 and the pressure within reference chamber 43 corresponding to the pressure in chamber 22 is applied through port 43a, to the end that valve member 46 is moved toward throat 44 to decrease flow therethrough and hence the pressure within chamber 42 and at the outlet 57 thereof so as to maintain a difference between the fluid pressure in chamber 42 and that in chamber 22 determined by the adjustment of the spring 53.

The setting of the spring 53 and the differential fluid pressure may be varied by adjustment of the armature 48. The output voltage of generator 61 is sensed through leads 70 and 71 by coil 47 so that as the voltage increases, armature 48 is attracted by the electromagnetic coil 47 and moves away from shoulder 56 against the bias of armature spring 50, thus decreasing the differential pressure setting of the bellows spring 53 and in turn the speed of the turbine 73 and output voltage of the generator 61. The bias of armature spring 50 is adjusted to the end that armature 48 is positioned medially of coil 47 and shoulder 56 to control the speed of the turbine 73 and thereby the output voltage of the generator 61 to the desired value.

At this point of adjustment, pressure regulator assembly 33 functions in a conventional manner and controls flow through throat 44 so as to maintain a substantially constant difference between the fluid pressures in chambers 22 and 42. Thus, as the pressure of the operating fluid in chamber 19 falls due to its being expended in driving turbine 73, bellows spring 53 adjusts valve member 46 relative to throat 44 so as to maintain the pressure of the operating fluid within reducer chamber 42 in excess of that in chamber 22 by the value determined by the adjustment of spring 53.

In the event the load on generator 61 increases, the velocity of turbine 73 decreases due to the increased load and the resulting drop in the output voltage of generator 61 produces a relatively lower energization of coil 47. Armature spring 50, therefore, moves armature 48 away from its balanced position toward shoulder 56 to compress bellows spring 53 thereby increasing the differential pressure setting of spring 53 and moving valve member 46 in a direction to increase the fluid pressure in reducer chamber 42. As a result, the operating fluid or compressed air is delivered at a higher pressure to turbine 73 and the speed thereof is thereby increased until the armature 48 is once more in a balanced position.

In the event the load on generator 61 decreases, the turbine 73 increases in speed with the result that the output voltage of generator 61 exceeds the desired value. Under these conditions, armature 48 is moved from its medial position in the direction of coil 47, with the result that the differential pressure setting and the biasing effect of bellows spring 53 on bellows 39 is decreased. The pressure of the compressed air is therefore effective to compress bellows 39 thereby moving valve member 46 in the direction of throat 44 and decreasing the pressure of the compressed air in reducer chamber 42. The resulting decrease in the pressure of the compressed air being delivered to turbine 73 results in reducing the speed thereof until armature 48 is once more in a balanced position.

As above set forth, the compressed air exhausting from nozzle 76 of turbine 73 into turbine chamber 79 is at a substantially higher pressure than the prevailing atmospheric pressure. It is manifest therefore, that the compressed air passes from turbine chamber 79 through vent passages 84 into chamber 22 from whence it passes through louvres 89 in generator housing 60 and exits through orifice 88. By providing an orifice 88 having a suitable cross sectional area, the aforenoted flow of the compressed air is controlled so as to maintain the pressure and density of the operating fluid within chamber 22 at a value sufficiently high as to avoid excessive wear and arcing at the generator brushes.

Orifice 88, therefore, serves to provide means whereby the compressed air, or operating fluid passes from chamber 22 at a desired rate of flow, and in addition, the density of the operating fluid or air in the chamber 22 during this flow is maintained at a desired value.

Further, an efficient transfer of heat from generator 61 to the operating fluid flowing through chamber 22 is achieved and generator 61 operates under conditions preventing excessive overheating.

Moreover, in the event generator 61 employs carbon brushes, the operating fluid or air in chamber 22 contains a sufficient amount of oxygen, under the pressure or density maintained in chamber 22, to prevent undesirable wearing of the carbon brushes.

From the foregoing description and operation of the novel power unit contemplated herein, it will be apparent to one skilled in the art, that the various objects of the instant invention hereinbefore set forth have been achieved.

Although only one embodiment of the instant invention has been illustrated and described, various changes in the form and relative arrangement of the parts, which will now appear to those skilled in the art, may be made without departing from the scope of the invention.

We claim:

1. A self-contained power unit for generating electrical energy and adapted for use in vehicles traversing high altitudes, said unit comprising a tank, a first chamber in said tank, means for introducing compressed air into said first chamber at a pressure in excess of atmospheric pressure, a second chamber centrally disposed in said tank, an initiating valve in said second chamber, conduit means connecting said first chamber to said initiating valve, actuating means for operating said initiating valve to permit flow of the compressed air from said first chamber through said conduit means and initiating valve, a generator in said second chamber, said generator including a rotor mounted on a hollow shaft and slidable contacting means cooperating therewith, second conduit means connecting said initiating valve to one end of said hollow shaft, a third chamber disposed at one end of said tank, a turbine in said third chamber operatively connected to the other end of said hollow shaft, said turbine including a reaction nozzle and means communicating said hollow shaft with said nozzle whereby said compressed air is delivered to said nozzle to thereby rotate said turbine and operate said generator, said nozzle exhausting said compressed air into said third chamber, vent means communicating said third chamber to said second chamber, and orifice means venting said second chamber to atmosphere, said vent and orifice means providing a flow of said exhausting compressed air from said third chamber through said second chamber to atmosphere, and said orifice means effective to control the rate of said flow so as to maintain the density and pressure of the exhausting compressed air within said second chamber at a predetermined value in excess of the prevailing atmospheric pressure to prevent undesirable arcing and wear at the slidable contact means.

2. A self-contained power unit for generating electrical energy and adapted for use in vehicles traversing high altitudes, said unit comprising a tank, a first chamber in said tank, means for introducing compressed air into said first chamber at a pressure in excess of atmospheric pressure, a second chamber centrally disposed in said tank, an initiating valve in said second chamber, conduit means connecting said first chamber to said initiating valve, actuating means for operating said initiating valve to permit flow of the compressed air from said first chamber through said conduit means and initiating valve, a generator in said second chamber, said generator including a rotor mounted on a hollow shaft and slidable contact means cooperating therewith, second conduit means connecting said initiating valve to one end of said hollow shaft, a regulating valve between said initiating valve and second conduit, differential pressure responsive means for operating the regulating valve so as to maintain the air pressure in said second conduit in excess of the air pressure in said second chamber by a selected value, a third chamber disposed at one end of said tank, a turbine in said third chamber operatively connected to the other end of said hollow shaft, said turbine including a reaction nozzle and means communicating said hollow shaft with said nozzle, whereby said compressed air is delivered to said nozzle to thereby rotate said turbine and operate said generator, said nozzle exhausting said compressed air into said third chamber at a pressure in excess of atmospheric pressure, vent means communicating said third chamber to said second chamber, orifice means venting said second chamber to atmosphere, said vent and orifice means providing a flow of said exhausting compressed air from said third chamber through said second chamber to atmosphere, and said orifice means effective to control the rate of said flow so as to maintain the density and pressure of the exhausting compressed air within said second chamber in excess of that of the prevailing atmosphere and sufficient to prevent excessive wear and arcing at said sliding contact means under high altitude operating conditions.

3. A self-contained power unit for generating electrical energy and adapted for use in vehicles traversing high altitudes, said unit comprising a tank, a first chamber in said tank, means for introducing compressed air into said first chamber, a second chamber centrally disposed in said tank, an initiating valve in said second chamber, conduit means connecting said first chamber to said initiating valve, actuating means for operating said initiating valve to permit flow of the compressed air from said first chamber through said conduit means and initiating valve, a generator in said second chamber including a rotor mounted on a hollow shaft, second conduit means connecting said initiating valve to one end of said hollow shaft, a third chamber disposed at one end of said tank, a turbine in said third chamber operatively connected to the other end of said hollow shaft, said turbine including a reaction nozzle and means communicating said hollow shaft with said nozzle whereby said compressed air is delivered to said nozzle to thereby rotate said turbine and operate said generator, said nozzle exhausting said compressed air into said third chamber at a pressure in excess of atmospheric pressure, vent means communicating said third chamber to said second chamber, orifice means venting said second chamber to atmosphere, said vent and orifice means providing a flow of said exhausting compressed air from said third chamber through said second chamber to atmosphere, and said orifice means effective to control the rate of said flow so as to maintain the density and pressure of the exhausting compressed air within said second chamber in excess of a predetermined value and whereby said generator is cooled and undesirable arcing thereof is prevented, and pressure regulating means in said second conduit means including pressure responsive valve means operative in response to the difference in the pressure of the compressed air supplied said turbine and the pressure of the compressed air in said second chamber, said pressure responsive valve means regulating the pressure of the compressed air delivered from said first chamber to said turbine and maintaining the same in excess of the pressure in said second chamber so as to control the speed of said turbine and hence the output of said generator.

4. A self-contained power unit for generating electrical energy and adapted for use in vehicles traversing high altitudes, said unit comprising a tank, a first chamber in said tank, means for introducing compressed air into said first chamber, a second chamber centrally disposed in said tank, an initiating valve in said second chamber, conduit means connecting said first chamber to said initiating valve, actuating means for operating said initiating valve to permit flow of the compressed air from said first chamber through said conduit means and initiating valve, a generator in said second chamber including a rotor mounted on a hollow shaft, second conduit means connecting said initiating valve to one end of said hollow shaft, a third chamber disposed at one end of said tank, a turbine in said third chamber operatively connected to the other end of said hollow shaft, said turbine including a reaction nozzle and means communicating said hollow shaft with said nozzle whereby said compressed air is delivered to said nozzle to thereby rotate said turbine and operate said generator, said nozzle exhausting said compressed air into said third chamber at a pressure in excess of atmospheric pressure, vent means communicating said third chamber to said second chamber, orifice means venting said second chamber to atmosphere, said vent and orifice means providing a flow of exhausting compressed air from said third chamber through said second chamber to atmosphere, said orifice means effective to control the rate of said flow whereby said generator is cooled and undesirable arcing thereof is prevented, said second conduit means including a pressure regulating assembly for controlling the compressed air delivered to said turbine, said regulating assembly having pressure responsive valve means operative in response to a pressure differential between the pressure of said compressed air in said second chamber and the pressure of said compresed air delivered to said turbine, means for adjusting the responsiveness of said pressure responsive valve means to said pressure differential to vary the pressure of the compressed air delivered to said turbine, and means electrically associating said generator to said adjusting means whereby the pressure of said compressed air delivered to said turbine is varied in response to the output of said generator.

5. A self-contained power unit for generating electrical energy comprising a tank having a first chamber, means for introducing compressed air into said first chamber, a second chamber centrally disposed in said tank, a generator housing in said second chamber, a generator in said housing, a third chamber at one end of said tank, a turbine in said third chamber and operatively connected to said generator, conduit means whereby said compressed air is delivered to said turbine to drive the same, said turbine exhausting said compressed air into said third chamber, passage means communicating said third chamber with said second chamber, an orifice venting said second chamber to atmosphere, said orifice operative to control the rate of flow of said exhausting compressed air through said second chamber whereby said exhausting compressed air is effective to cool said generator and to maintain a pressure in said second chamber in excess of the prevailing atmospheric pressure, a flow control valve in said conduit means operative in one position to permit flow through said conduit means, and pressure regulator means in said conduit means between said flow control valve and said turbine for regulating the pressure of said compressed air delivered to said turbine means.

6. A self-contained power unit comprising a tank, a first chamber in said tank, means for filling said first chamber with a pressurized fluid, a second chamber centrally disposed in said tank, a third chamber at one end of said tank, electrical generating means in said second chamber, turbine means in said third chamber and operatively connected to said generating means for operating the same, conduit means communicating said first chamber to said turbine means whereby said pressurized fluid is delivered to and drives said turbine means, pressure regulator means associated with said conduit means and controlling the pressure of the fluid delivered from said first chamber to said turbine means, said pressure regulator means including adjustment means connected to said generating means and responsive to the electrical output thereof to vary the pressure setting of said regulator means and thereby the speed of said turbine and output of said electrical generating means, said adjustment means varying the pressure setting of said regulating means so as to maintain the electrical output of said generating means at a predetermined value, said turbine means exhausting said fluid into said third chamber, passage means communicating said third chamber to said second chamber, and orifice means communicating said second chamber to atmosphere, said orifice means controlling the rate of flow of said fluid through said second chamber.

7. A self-contained power unit comprising a tank, a source of pressurized fluid in said tank, a chamber in said tank, an electric generator in said chamber, a turbine drivingly connected to said generator, conduit means conducting said pressurized fluid from said source to said turbine for driving the same, means conducting the fluid exhaust from said turbine into said chamber, an orifice communicating said chamber with the atmosphere so that said exhausing fluid in passing through said chamber forms a cooling fluid stream for said generator and the pressure of the fluid in said chamber is maintained at a pressure in excess of atmospheric pressure, pressure regulating means in said conduit means controlling the pressure of said fluid delivered to said turbine, said pressure regulating means connected to and operative in response to the electrical output of said generator and the pressure of the fluid in said chamber to vary the speed of said turbine so that the electrical output of the generator is maintained at a substantially constant value.

8. A self-contained power unit comprising a tank, a source of pressurized fluid in said tank, a chamber in said tank, an electrical generator in said chamber, a turbine drivingly connected to said generator, conduit means conducting said pressurized fluid to said turbine for driving the same, means conducting the exhaust fluid from said turbine into said chamber and through said generator, an orifice communicating said chamber to atmosphere, said orifice operative to control the venting of said chamber to atmosphere whereby said pressurized fluid is effective to cool said generator and to maintain said chamber at a pressure in excess of atmospheric pressure.

9. A self-contained power unit comprising a tank, a first chamber in said tank, means for filling said first chamber with a pressurized fluid, a second and a third chamber in said tank, electrical energy generating means in said second chamber, turbine means in said third chamber and operatively connected to said generating means, conduit means communicating said first chamber to said turbine means whereby said pressurized fluid is delivered to and drives said turbine means, said turbine means exhausting into said third chamber, vent means communicating said third chamber with said second chamber, and orifice means communicating said second chamber with atmosphere, said orifice means operative to limit the flow of said fluid from said second chamber to atmosphere whereby said exhausting fluid is effective to cool said generating means and the fluid pressure in said second chamber is maintained at a pressure in excess of atmospheric pressure and at a density sufficient to prevent excessive arcing at said generating means under high altitude operating conditions.

10. The combination comprising a compressed air supply tank, a hollow bore in said tank, an electric generator mounted in said bore, an air driven turbine for driving said generator, a valve for regulating the supply of air to said turbine, control means for adjusting said valve to vary the speed of said turbine, and said control means including means responsive to the electrical output of said generator to vary the speed of said turbine and thereby the driven speed of said generator so as to maintain the output of said generator at a predetermined constant value.

11. The combination defined by claim 10 in which said control means includes an electromagnetic winding connected to the output of said generator, a differential pressure responsive device sensitive to the drop in the operating pressure across said turbine, spring means for varying the datum of said device, and an armature operated by said electromagnetic winding to adjust said spring means so as to maintain the output of said generator at a predetermined constant value.

12. The combination defined by claim 10 in which said generator includes a rotor and a stator, a hollow shaft for rotatably mounting said rotor relative to said stator, said hollow shaft conducting the supply of air from the regulating valve to the turbine so as to internally cool the rotor, means for directing the exhausting air from the turbine through said generator and into the bore of the supply tank, and an orifice opening the bore to atmosphere for regulating the flow of air from said bore so as to maintain the air in said bore at a density sufficient to effectively cool said generator and prevent excessive arcing in said generator under high altitude operating conditions.

13. The combination defined by claim 10 in which said generator includes a rotor, a stator and a hollow shaft for rotatably mounting said rotor relative to said stator, said hollow shaft conducting the supply of air from the regulating valve to the turbine so as to internally cool the rotor of said generator, said hollow shaft rotatably mounting the turbine relative to said stator and drivingly connecting the turbine to the rotor.

14. The combination defined by claim 10 including means for directing the exhausting air from the turbine through said generator and into the bore of the supply tank, and an orifice opening the bore to atmosphere for regulating the flow of air from said bore so as to maintain the air in said bore at a density sufficient to effectively cool said generator and prevent excessive arcing in said generator under high altitude operating conditions.

WALTER D. TEAGUE, Jr.
EMIL A. VOLK, Jr.

References Cited in the file of this patent

UNITED STATES PATENTS

| Number | Name | Date |
|---|---|---|
| 525,390 | McElroy | Sept. 4, 1894 |
| 548,930 | Sargent | Oct. 29, 1895 |
| 1,528,754 | Bresson | Mar. 10, 1925 |
| 2,285,775 | Keele | June 9, 1942 |
| 2,299,406 | Potter | Oct. 20, 1942 |
| 2,436,683 | Wood, Jr. | Feb. 24, 1948 |
| 2,444,415 | Beeson | July 6, 1948 |
| 2,495,745 | Litton | Jan. 31, 1950 |